C. L. BARRITT.
Harvester Rake.
No. 77,244.
Patented April 28, 1868.
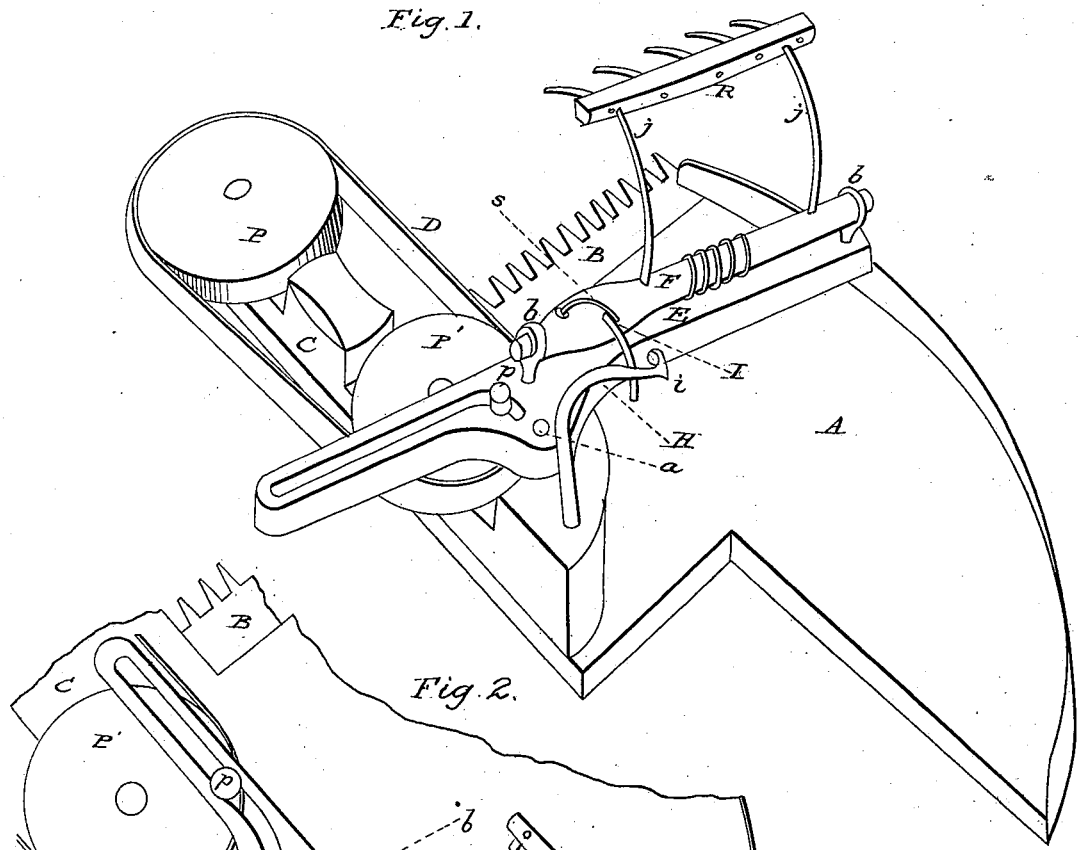
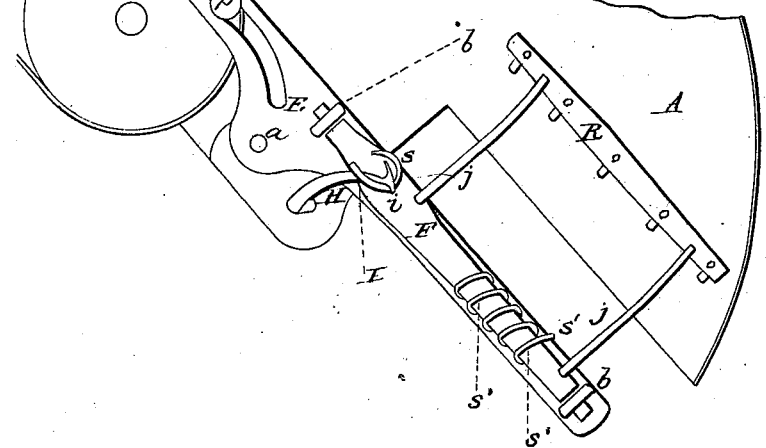

United States Patent Office.

CHARLES L. BARRITT, OF RICHLAND, MICHIGAN.

Letters Patent No. 77,244, dated April 28, 1868.

---

IMPROVEMENT IN HARVESTER-RAKES.

---

*The Schedule referred to in these Letters Patent and making part of the same.*

---

TO ALL WHOM IT MAY CONCERN:

Be it known that I, CHARLES L. BARRITT, of Richland, in the county of Kalamazoo, and State of Michigan, have invented a new and useful Improvement in Automatic Rakes for Harvesters; and I do hereby declare that the following is a full, clear, and exact description of the construction and operation of the same, reference being had to the annexed drawings, making a part of this specification, in which—

Figure 1 is a perspective view.

Figure 2 is a partial plane view.

Similar letters of reference indicates corresponding parts in both figures.

My improvement relates to that class of rakes that by an intermitting or continuous vibratory motion, back and forth, rake off the cut grain automatically from the segmental platform of a reaping-machine, and deposit it in gavels, by a side delivery, at the tail-end, in a state convenient for binding; and the better to enable others skilled in the art to construct my invention, I will now proceed, with the aid of the letters of reference, as seen in the drawings, to describe the same.

A represents the segmental platform, and B the finger-bar of a reaper. To the side of the reaper-frame (not seen) furthest from the platform, I connect firmly, in any suitable manner, a bar-frame, C, of any proper material, so as to project horizontally behind said reaper-frame, and in line with it or not, as circumstances may require, said bar or frame being designed to support the platform, also the rake and devices for operating it. Two pulleys of suitable size, marked, respectively, P P', are pivoted, as seen, to the upper side of the frame aforesaid, and are connected by a belt or chain, D, passing around them; if by the latter, the pulleys should be grooved to receive it.

A vibrating slotted radius-bar, E, is pivoted through a side ear at $a$, to the frame, the slotted portion resting upon and traversing the face of the pulley P', while the other part extends to and across the platform, but at a sufficient height above it to clear all cut grain on it. A stud-pin, $p$, inserted near the periphery of the pulley P', passes through the slot in the radius-bar, which, as the pulley revolves, communicates a vibratory motion to the radius-bar and connected rake. The pin $p$ should have an overlapping head, to prevent the lifting of that end of the bar, and the slot may be straight or cam-shaped, as in the drawing, as experience may determine.

I connect the rake R by two or more rods, $j$, of suitable form and size, to a rocking-shaft, F, which shaft is hung in bearings, $b$, to the radius-bar, above and parallel with that portion extending across the platform.

I elevate the rake, at the commencement of the return stroke, by the means of an arm-hook, H, connected firmly to the frame C, operated by the aid of a spring-catch rod, I, the lower end of which is pivoted in an angular mortise in the rocking-shaft, so that a simple bent spring, as at $s$, or any other light spring-device which may be suitable, will throw the said catch-rod behind a retaining-lip, $i$, on the hook.

When necessary to press a light rake down to the platform, I usually employ a wire spring, $s'$, coiled around the rocking-shaft, and attached below to the radius-bar.

I have not exhibited in the drawings any mode of driving the pulley P from the reaper, or of suspending or intermitting the vibration of the rake, for the reason that they are not necessarily connected with the subject-matter of my invention; but I will say here, that I generally gear said pulley to a loose bevel-wheel on the reaper-axle, and lock or unlock it with said axle, at the pleasure of the driver, by a clutch, as usual in such cases.

The operation is as follows: The teeth of the rake being down on the platform at the commencement of the raking-stroke, as the pulley P' rotates, its stud-pin $p$, traversing the slot in the radius-bar, causes said bar and its rake to vibrate in a circular path, sufficiently to just rake off the cut grain, and deposit it by a side delivery on the ground.

As the rake approaches the end of this vibration, the lower portion of the spring-catch rod I impinges against the face of the hook, so as to force back the rod, which, as it rubs past, springs back behind the retaining-lip *i* of said hook in such manner that on the return vibration it turns the rocking-shaft and elevates the rake, keeping it so elevated, in the manner as clearly seen in fig. 1, until the end of the stroke, when the catch-rod is drawn away from under the hook-arm, and the rake falls to its first position.

I do not claim vibrating the radius-bar by means of the pulley, pin, and slot; but, having described my invention,

What I claim as new, and desire to secure by Letters Patent, is—

1. The arrangement and combination of the driving-pulley P', or equivalent gear-wheel, stud-pin *p*, and slotted radius-bar E, with the rocking-shaft F, and connected rake R, substantially as and for the purpose herein described.

2. I claim the stationary arm-hook H, in combination with the spring-catch rod I, when connected and arranged relatively with the rocking-shaft, slotted radius-bar, and frame aforesaid, for the elevation of the rake during its return stroke, substantially in the manner as set forth.

CHARLES L. BARRITT.

Witnesses:
 WILL. R. LEWIS,
 OTTO L. JOHNSON.